(12) United States Patent
Akhteruzzaman et al.

(10) Patent No.: US 6,580,787 B1
(45) Date of Patent: Jun. 17, 2003

(54) INTEGRATION OF VOICE MAIL, EMAIL, FAX AND PERSONAL CALENDAR SYSTEMS TO AUTOMATICALLY UPDATE MESSAGES

(75) Inventors: Akhtar Akhteruzzaman, Naperville, IL (US); Richard J. Brockman, Naperville, IL (US); Paul R. Sand, Woodridge, IL (US); Phillip M. Sands, Champaign, IL (US); Richard G. Sparber, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/504,401

(22) Filed: Feb. 15, 2000

(51) Int. Cl.[7] ................................................ H04M 1/64
(52) U.S. Cl. ................ 379/88.22; 379/67.1; 379/88.13; 379/88.14; 379/88.17; 379/88.19; 379/88.25
(58) Field of Search ....................... 379/67.1, 83, 88.04, 379/88.08, 88.13, 88.14, 88.17, 88.18, 88.22, 88.25, 900, 902, 905, 908, 88.19, 88.21

(56) References Cited

U.S. PATENT DOCUMENTS

| | | | | |
|---|---|---|---|---|
| 5,008,926 A | * | 4/1991 | Misholi | 379/88.13 |
| 5,276,731 A | * | 1/1994 | Arbel et al. | 379/88 |
| 5,394,445 A | * | 2/1995 | Ball et al. | 379/67 |
| 5,434,908 A | * | 7/1995 | Klein | 379/88 |
| 5,602,652 A | * | 2/1997 | Ishiwatari et al. | 358/450 |
| 5,742,905 A | * | 4/1998 | Pepe et al. | 455/461 |
| 5,778,053 A | * | 7/1998 | Skarbo et al. | 279/93.21 |
| 5,872,841 A | * | 2/1999 | King et al. | 379/209 |
| 5,946,386 A | * | 8/1999 | Rogers et al. | 379/265 |

* cited by examiner

Primary Examiner—Allan Hoosain

(57) ABSTRACT

Voice mail, email, fax and personal calendar systems are integrated allowing for the automatic updating of voice mail and email responses to received telephone calls and emails indicating that the receiver of the telephone call/email is out of the office, temporarily unavailable, etc. For received telephone calls, a determination is made as to whether the call was received during or outside of normal working hours, and if the person receiving the call is still engaged beyond a previous entered time period for providing an appropriate message to the caller. The determination is also made as to whether the received call is an "inside" or "outside" call, e.g., originating within or outside of the office or organization being called, and a predetermined response is provided depending upon where the call originated. In response to an incoming fax, the number of the fax transmitter is stored and used to provide a return fax response with a predetermined message from the calendar server of the person receiving the call. Provision is made for updating the user status at any time and, thus, automatically changing the outgoing voice mail, email or fax message.

10 Claims, 4 Drawing Sheets

INTEGRATION OF VOICE MAIL, EMAIL, FAX AND PERSONAL CALENDAR SYSTEMS TO AUTOMATICALLY UPDATE MESSAGES

TECHNICAL FIELD

This invention relates generally to personal communications systems and is particularly directed to the integration of voice mail, email, fax and personal calendar systems for automatically providing an updated response to an incoming message as to the status, location, etc., of the person receiving the telephone call, email or fax.

BACKGROUND OF THE INVENTION

Current communications links for individuals and businesses include telephones, of both the landline and wireless type, global information networks, such as the Internet, and facsimile ("fax") systems. The telephone communications link has been supplemented with voice mail which provides the caller with a message in the event the person being called is not available. This message generally requests that the caller leave his or her name and return telephone number or perhaps directs the caller to another number at which the person being called can be reached. The voice message provided to the caller must be updated by the person receiving the call when the status of that person changes, i.e., the person receiving the call is no longer in a meeting, has returned from vacation, etc. This approach provides only limited information to the caller as to when, and if, his or her call will be returned. Moreover, if the person being called does not update the response message, the caller may be relying on outdated information and, as a result may be unsuccessful in attempting to communicate with the intended party.

The present invention addresses the aforementioned limitations of prior art by integrating voice mail, email, fax and personal calendar systems to provide for the automatic updating of response messages to incoming calls.

SUMMARY OF THE INVENTION

This invention contemplates the integration of voice mail, email, fax and personal calendar systems to automatically update messages provided in response to incoming communications via any of the aforementioned links. Upon receipt of an incoming telephone call, the calendar server makes the determination as to whether the call is received during or outside of normal working hours and also if the person receiving the call is still engaged beyond a previously entered time, such as attending an extended meeting. An appropriate audio response is provided to the caller indicating, if the call is received out of normal business hours, when the person being called will be available to return the call, or if the person being called is unavailable during normal business hours. The determination is also made whether the receiving call is an "inside" or "outside" call, i.e., originating within or outside of the office or organization being called, and a predetermined response is provided depending upon when the call originated. The calendar server is periodically scanned for updating the response to incoming voice mail, email and fax messages upon a change in status, location, etc., of the person being called from a previous scan. When a change occurs, an updated voice mail message is generated based upon the name of the calendar owner and that person's schedule as recorded in the calendar server. The individual calendars of plural users are sequentially scanned and updated messages are provided to the appropriate server of each person, as needed. Additionally, if the calendar server detects an extended absence from the office exceeding a previously defined time limit, an email response is provided to the originator of an incoming email informing that person that the called party is out of the office and may be unable to answer the email message promptly. In the event an incoming fax is received, the system automatically provides a predetermined fax message to the originating fax number advising of the status and/or location of the recipient of the fax message. Information in the calendar server is periodically scanned and automatically provided to each of the other servers for updating purposes. Provision is also made for manual updating of the calendar server by the user and providing this updated information to the other servers when entered.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
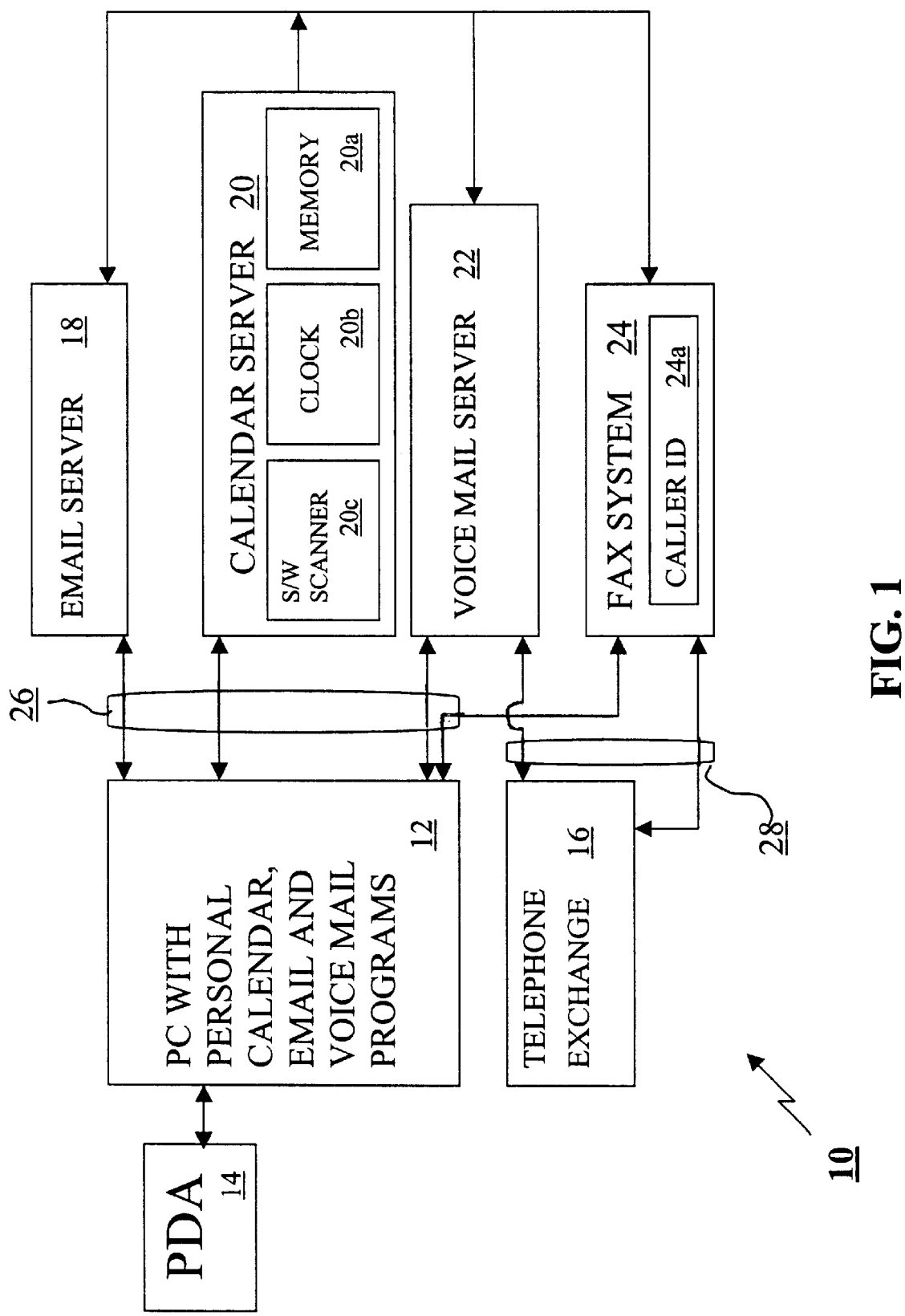
FIG. 1 is a simplified block diagram of an integrated voice mail, email, fax and personal calendar system for automatically updating messages in accordance with the principles of the present invention.

Referring to FIG. 1, there is shown a simplified block diagram of an integrated voice mail, email, fax and personal calendar system 10 in accordance with the principles of the present invention. The term "fax" is used herein as a shortened expression for "facsimile" involving the well-known transmission of hard copy messages via a conventional telephone network.

The integrated message system 10 of FIG. 1 includes a personal computer ("PC") 12 including personal calendar, email, and voice mail programs. It is by means of PC 12 that a client, or user, of the integrated message system 10 enters information which is used in responding to an incoming telephone, email or fax message when the client is not available to receive the incoming message. PC 12 is conventional in design and operation and includes a video display as well as input means, such as a keyboard, which are not shown in the figure for simplicity. PC 12 may be connected to a hand-held input device 14, such as a Personal Digital Assistant (PDA), which allows the client to make calendar entries when not at the PC, which entries may be later loaded into the PC. The hand-held input device may be connected to the PC via an optical, wireless, or cable type interface.

The integrated message system 10 further includes an email server 18, a calendar server 20, a voice mail server 22, and a fax system 24. Email server 18, calendar server 20, voice mail server 22 and fax system 24 are connected to PC 12 by means of a data network, e.g., Internet Protocol (IP), 26. Voice mail server 22 and fax system 24 are connected by means of the analog lines 28 of a telephone exchange 16. Telephone exchange 16 may be a standard, public telephone network. Various servers may be used for the email server 18, calendar server 20, voice mail server 22 and within the fax system 24. Examples of servers which could be used in the present invention include a Microsoft Exchange Server for email server 18 and calendar server 20, while an Intuity Message Server available from Lucent Technologies, Inc. of Holmdel, N.J., could be used for voice mail server 22 and also within the fax system 24.

The calendar server 20 is periodically updated via the IP network 26 from PC 12 by means of client inputs. Updating of the status of the client from PC 12 to calendar server 20 may be by means of a Microsoft Schedule Plus program stored in the PC. In addition, the client's status may also be updated by means of the hand-held data input device 14, via PC 12 and IP Network 26.

The calendar server 20 includes a memory 20a for storing the schedules of various clients, a clock 20b, and a software scanner 20c for periodically scanning the contents of the memory and providing schedule information, including availability, of the various clients to the email server 18, voice mail server 22, and fax system 24. By periodically scanning the client status information stored in the calendar server memory 28, current client status information is provided to the email server 18, voice mail server 22, and fax system 24 in a timely manner.

Figure 2:
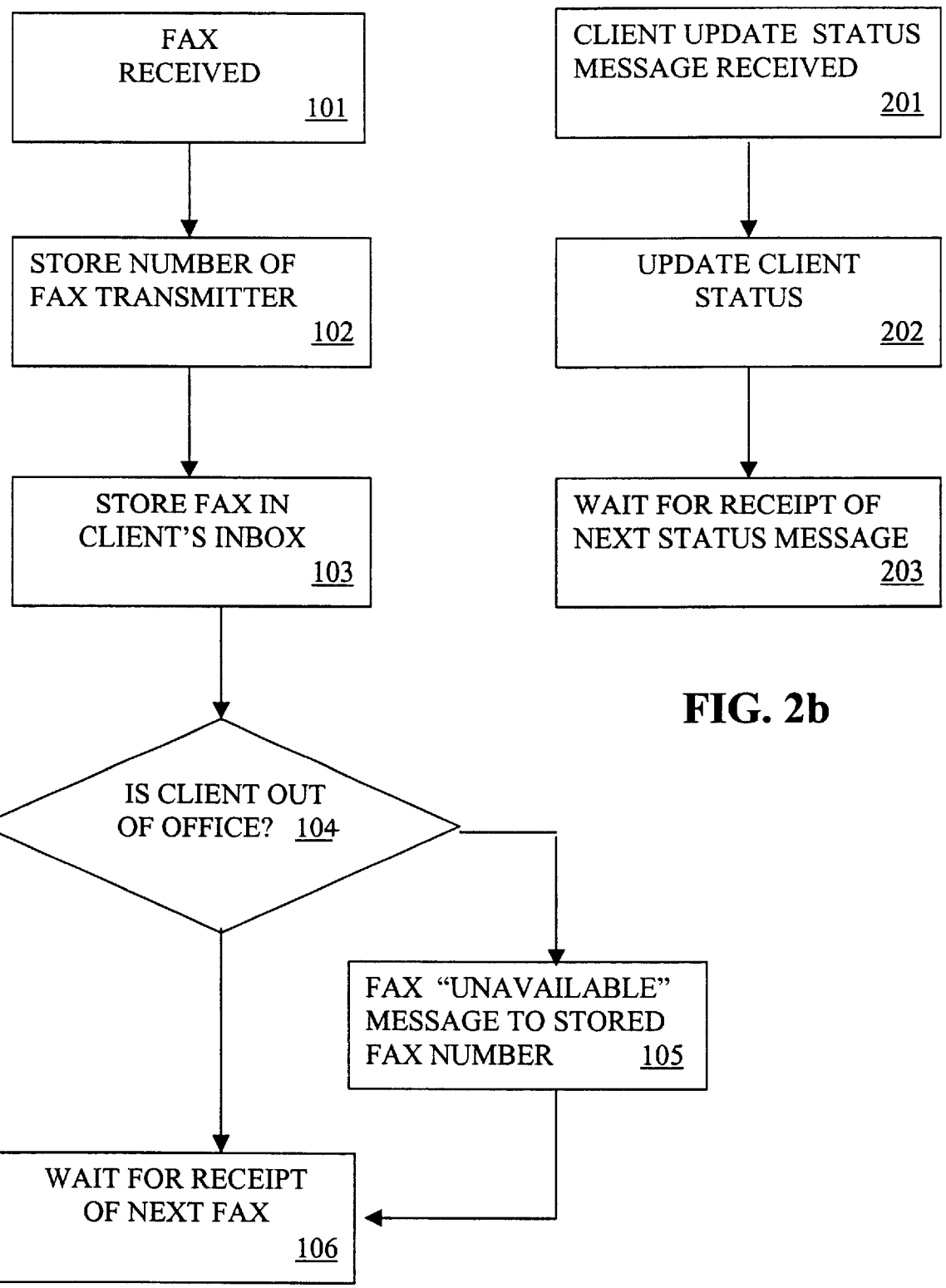
FIG. 2a is a simplified flow chart illustrating the steps involved in receiving and processing a fax by the integrated voice mail, email, fax and personal calendar system of the present invention.
FIG. 2b is a simplified flow chart illustrating the steps involved in the client status update process in updating a fax response upon receipt of an incoming fax-in accordance with one aspect of the present invention.

Referring to FIG. 2a, there is shown a simplified flow chart of the steps carried out under the control of a program stored in the calendar server 20 in automatically providing an updated status message via fax in response to an incoming fax in accordance with one aspect of the present invention. At step 101, an incoming fax message is receiving by fax system 24 via telephone exchange 16. The number of the fax machine from which the incoming fax message is transmitted is stored in memory such as by means of a caller identification ("ID") device 24a within fax system 24 at step 102. Alternatively, the transmitting telephone number signaled to the receiving fax machine at the start-up of fax message negotiation may be stored in another form of memory within the fax system 24. At step 103, the incoming fax message is stored in the client's Inbox based on the dialed number. In this context, fax system 24 may accommodate plural telephone numbers and store various individual status messages for several clients. At step 104, the program stored in the fax system 24 determines if the client is out of the office based upon the client's current status as provided by the client via PC 12 to the fax system 24. If at step 104 it is determined that the client is out of the office, the program proceeds to step 105 and transmits a return fax to the calling, or stored, fax number indicating that the called client is currently unavailable to read the fax. The program then proceeds to step 106 and waits for receipt of the next incoming fax message. If in step 104, the program stored in the fax system 24 determines that the client is not out of the office, the program proceeds to step 106 and waits for receipt for the next incoming fax. If the client is in the office at the time of receipt of an incoming fax as determined at step 104, a return fax message is not provided to the originator of the incoming fax because it is assumed that the client will, in due course, receive and respond to the incoming fax message.

Referring to FIG. 2b, there is shown a simplified flow diagram of the steps involved in updating a client status message transmitted via fax in response to an incoming fax message in accordance with another aspect of the present invention. At step 201, a client update status message is received by the calendar server 20 from either PC 12 or hand-held input device 14. The program then at step 202 updates the client's status, providing an indication in the response fax message as to whether the client is in or out of the office and able to respond to receipt of a fax message. Text may also be added by the client to the response fax as to when the client expects to return to the office to permit the client to read and respond to the incoming fax message. At step 203, the program returns to the receipt mode waiting for the receipt of the next status message from the client.

Figure 3:
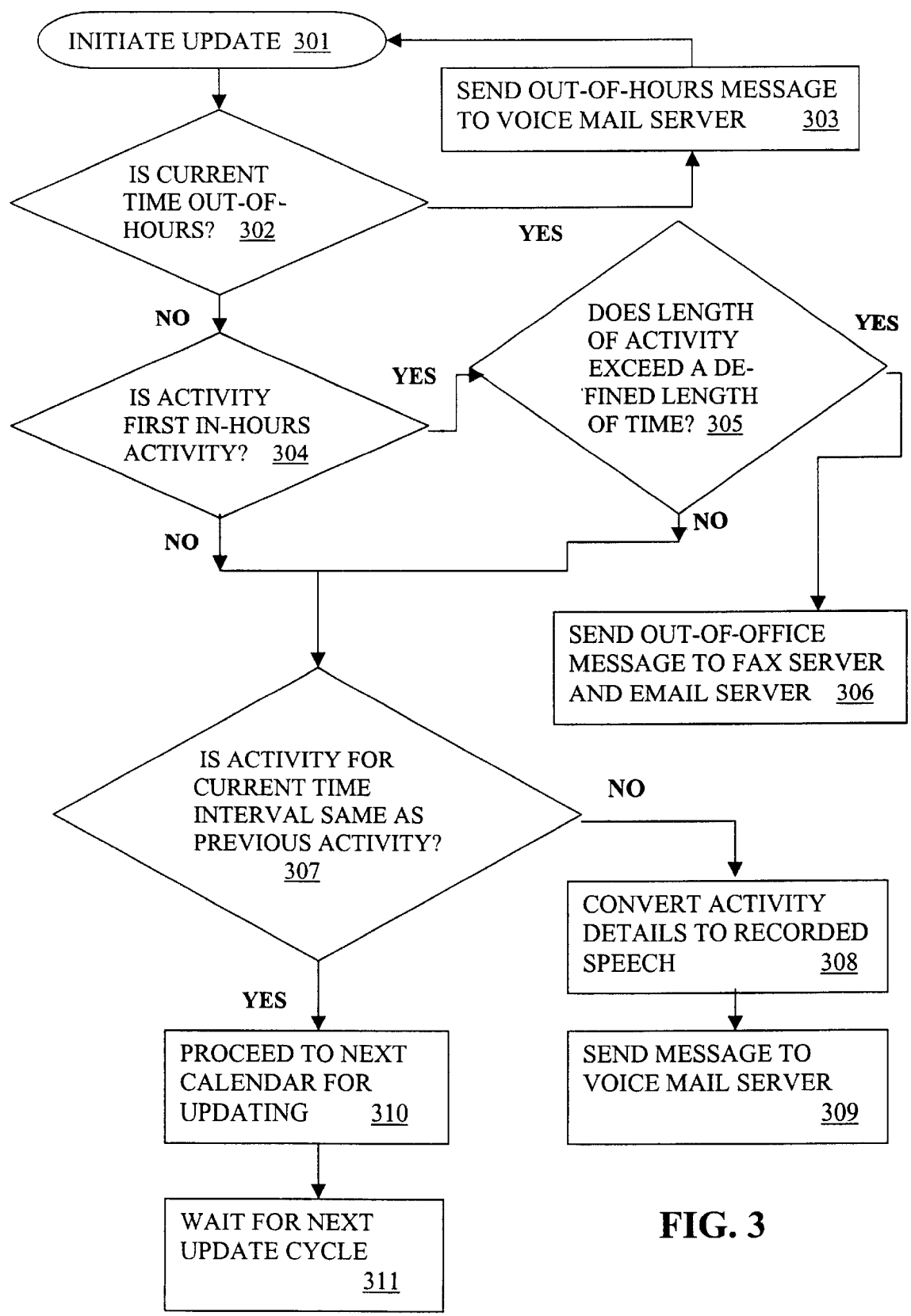
FIG. 3 is a simplified flow chart illustrating the steps involved in updating the calendar server status of a user of the integrated voice mail, email, fax and personal calendar system of the present invention.

Referring to FIG. 3, there is shown a simplified flow chart illustrating the steps involved in updating the status of a client in the calendar server 20 of the integrated message system 10 of the present invention. The steps carried out in FIG. 3 are under the control of a program stored in the calendar server 20 for updating the status message provided in response to an incoming telephone, email or fax message. The calendar server update program is initiated at step 301, followed by a determination at step 302 as to whether the current time is out-of-hours. "Out-of-hours" is defined for purposes of the present invention as not within the regular working hours of the client. If it is determined at step 302 that the current time is out-of-hours, the program proceeds to step 303 and sends an out-of-hours message to the voice mail server 22. This informs the caller via voice mail that the incoming message has been received out-of-hours, and the client can be expected to respond to the incoming message during the next in-hours working period. The program then returns to step 301 and again initiates the client status update procedure in the calendar server 20.

If at step 302, it is determined that the current time is not out-of-hours, the program proceeds to step 304 and determines if the activity is the first in-hours activity. If the activity is the first in-hours activity, the program proceeds to step 305 and determines if the length of the activity exceeds a defined length of time previously entered by the client in the calendar server 22. If it is determined at step 305, that the length of the activity exceeds a defined, predetermined length of time, the program proceeds to step 306 and, in response to an incoming message, sends an out-going, out-of-office message to the fax system 24 and email server 18. The fax system 24 and email server 18 will then automatically provide an out-of-office message in response to an incoming fax or email message. The out-of-office message sent at step 306 indicates that the client is unavailable for a predetermined time, and will not read the incoming fax message until after this period expires.

If at step 304 the program determines that the activity is not the first in-hours activity or if at step 305 it is determined that the length of the activity does not exceed a defined length of time, the program proceeds, in either case, to step 307 for determining if the activity for the current time period is different from the previous activity. If at step 307 it is determined that the activity for the current time period is not the same as the previous activity, the program proceeds to step 308 for converting activity details to recorded speech via text-to-speech software and sending a message to the voice mail server 22 at step 309. The message sent to the voice mail server 22 provides the caller with a voice mail message indicating that the client is unavailable for an indicated time period, and will not read the fax until the indicated time period expires. If the current activity is "idle", then the calendar server 20 provides default messages to the email server 18, voice mail server 22 and fax system 24. Stored in the calendar server memory 20a are two types of states for activities. One state relates to activities that are planned for a given time period. A second type of activity stored in the calendar server memory 28 is an unplanned activity, which in the present application, is referred to as an "idle" activity. In response to receipt of an idle activity input from the calendar server 20, any of the email, voice mail or fax servers will provide a default message in the form of a standard greeting, such as advising that the client is not currently available, but will soon read the incoming message.

If at step 307, it is determined that the activity for the current time interval is the same as that of the previous activity, the program proceeds to step 310 for updating the calendar server of the next client. After all client calendar servers are updated with the most recent client status information, the program proceeds to step 311 and waits for the next update cycle following a predetermined time interval such as, for example, 15 minutes.

Figure 4:
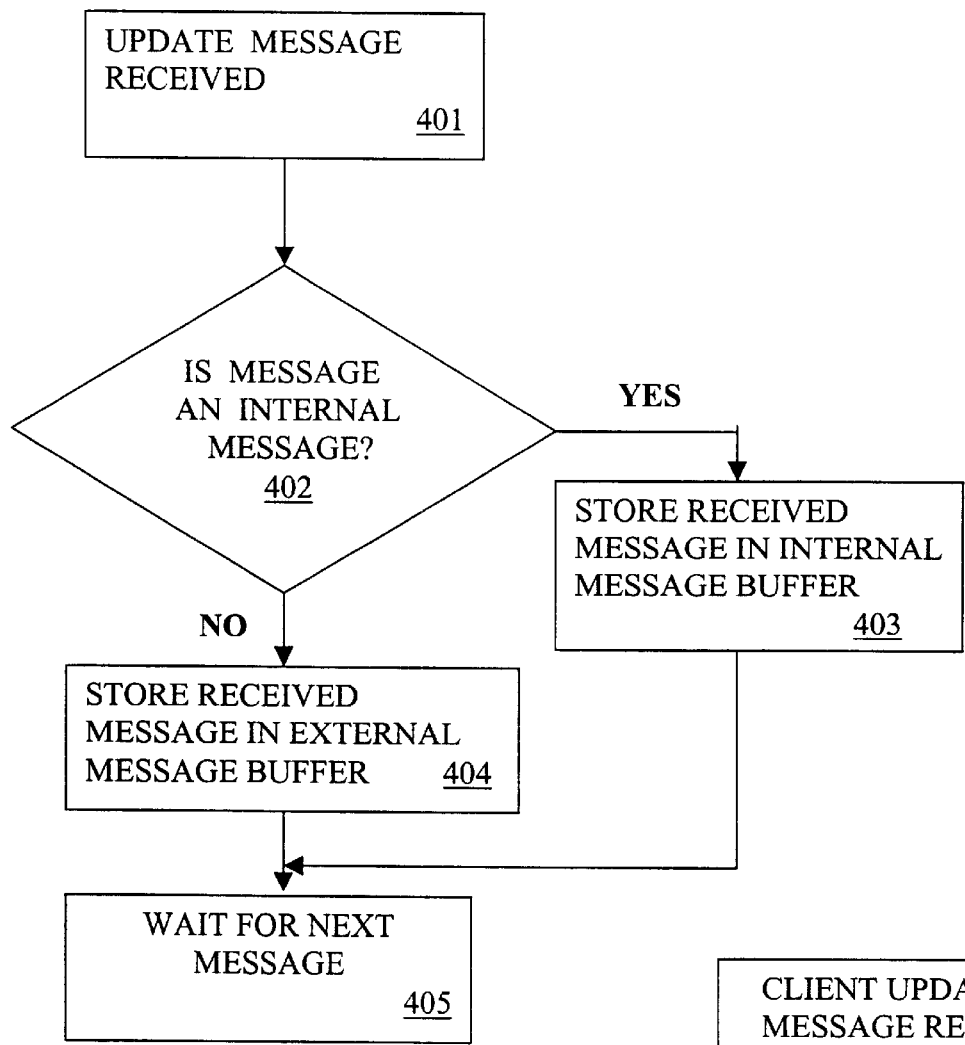
FIG. 4 is a simplified flow chart illustrating the steps involved in updating voice mail messages output in response to an incoming telephone call in accordance with another aspect of the present invention.

Referring to FIG. 4, there is shown a simplified flow chart illustrating the steps involved in updating the voice mail server 22 with a client's most recent status information. At step 401, the program stored in the calendar server 20 provides an updated client status message from the calendar server 20 to the voice mail server 22. The updated message is in the form of a spoken message using text to speech conversion, which is stored in a buffer in the voice mail server 22 for subsequent replay in response to an incoming call. The program next at step 402 determines if the received incoming message is an internal message, i.e., originating from the client's department, section, company, etc. If it is determined in step 402 that the received message is an internal message, the program proceeds to step 403 and stores the message and calling party's number in an internal message buffer for the specified client. The program then proceeds to step 405 and waits for the next incoming message. If at step 402, it is determined that the message is not an internal message, but rather is receiving from someone outside of the client's department, section, company, etc., the program proceeds to step 404 and stores the received message in an external message buffer and then proceeds to step 405 and waits for the next incoming message. Typically, a response provided to a received internal message will be more specific in detail than that provided to a received external message. For example, a response to a received internal message may be "Client is in meeting with Mr. Jones until 9:00". On the other hand, a typical response to a received external message might be "Client is busy until 9:00".

Figure 5:
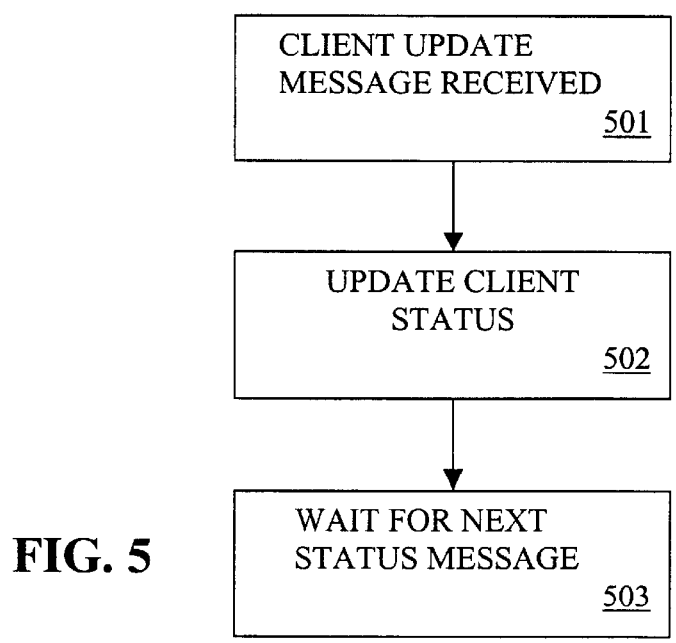
FIG. 5 is a simplified flow chart illustrating the steps involved in updating a user's status provided in an outgoing email message in response to a received email message.

Referring to FIG. 5, there is shown a simplified flow chart illustrating the steps involved in updating client status messages in the email server 22. At step 501, a client status update message is received by the email server 18. At step 502, the email server 18 updates the client's status in memory so as to provide an appropriate response message in response to an incoming email message. The program then at step 503 waits for the next status message sent from the calendar server 20.

A sample schedule for a given client for storage in the client's calendar server may be as follows:

| Client | Begin Time | End Time | Description |
| --- | --- | --- | --- |
| Smith, John | 8:00 AM | 9:00 AM | Meeting with Jim Jones |
| | 10:00 AM | 11:30 AM | Conference call on Project Blue |
| | Noon | 1:00 PM | Lunch |
| | 1:00 PM | 5:00 PM | Make Sales Calls |
| Jones, Jenny | 8:00 AM | 5:00 PM | Trip to Headquarters |

At 8:00 AM, the calendar server 20 checks John Smith's calendar and determines that the current activity is different from the previous activity, which in the present case is idle. An internal message of "John Smith is meeting with Jim Jones until 9:00 AM" is constructed by the program stored in the calendar server 20 and is provided t he voice mail server 22. An external message such as "John Smith is busy until 9:00 AM" is constructed by the calendar server 20 and is also provided to the voice mail server 22.

The calendar server 20 also checks the calendar of Jenny Jones at 8:00 AM and determines that the appointment is longer than the previously defined (and entered) length of time. An internal message such as "Jenny Jones is out for the day for a trip to headquarters" is constructed by the calendar server 20 and provided to the voice mail server 22. An external message such as "Jenny Jones is busy all day" is constructed by the calendar server 20 and also provided to the voice mail server 22. In addition, an out-of-the-office is provided by the calendar server 20 to the fax system 24 and email server 18. At 8:15 AM, 8:30 AM, and 8:45 AM the calendar server 20 checks the calendars of John Smith and Jenny Jones and determines that the current activities are the same as the previous activities and takes no action. At 9:00 AM the calendar server 20 again checks John Smith's calendar and determines that the current activity "idle" is different from the previous activity. The standard internal and external messages are again constructed by the calendar server 20 and are provided to the voice mail server 22. An example of either an internal or external message of this type would be "John Smith is in the office, but not able to answer you call right now". This process is continued until, for example, 5:15 PM when the calendar server 20 determines that it is now out-of-hours, i.e., after work, so that the calendar server 20 constructs standard out-of-hours message and provide these messages to the voice mail server 22. An in-the-office message is provided by the calendar server 20 to the email server and fax system of Jenny Jones.

While particular embodiments of the present invention have be shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. For use in a communications network wherein calls are transmitted from a first party to a second parts within an organization, and wherein a status message is provided from said second party to said first party when said second party is unavailable to receive an incoming call, a system for automatically updating the status message of the second party, said system comprising:

input means for entering status information of the second party for use when the second party is unavailable to receive an incoming call;

personal calendar means coupled to said input means for storing the status information of the second party for a selected period, wherein said personal calendar means includes a memory for storing status information of plural parties for use when one of the plural parties receives an incoming call and wherein said personal calendar means includes a calendar server and said telephone network includes a voice mail server;

communications means coupled to said personal calendar means for providing the first party with a message of the status of the second party when the second party is not available to receive an incoming call;

scanning means for periodically accessing said personal calendar means and providing an updated message to the first party via said communications means of the status of the second party when the second party is not available to receive an incoming call; and wherein said memory stores first and second status information for one or more of said plural parties and the first party is defined as inside or outside of the organization, and wherein said first status information is provided if the first party is inside said organization and said second status information is provided if the first party is outside said organization.

2. The system of claim 1 wherein said communications network is a telephone network and said message is a voice mail message.

3. The system of claim 1 wherein the communications network comprises a global information network and said message is an email message.

4. The system of claim 1 wherein-said communications network is a telephone network and said message is a fax message.

5. The system of claim 4 wherein said communications network includes a fax server with caller identification means for identifying the caller and storing the caller's directory number for transmitting said fax message to the first party.

6. The system of claim 1 wherein said input means includes a personal computer.

7. The system of claim 6 wherein said input means further includes a hand held communications device coupled to said personal computer.

8. The system of claim 1 further comprising an Internet Protocol network connecting said input means to said personal calendar means.

9. The system of claim 1 wherein said first class includes a first party who is known by said second party and said second class includes a first party who is not known by said second party.

10. The system of claim 1 wherein said first class includes a first party who works with said second party and said second class includes a first party who does not work with said second party.

* * * * *